United States Patent [19]

Moriya

[11] Patent Number: 5,099,336

[45] Date of Patent: Mar. 24, 1992

[54] COPYING MACHINE CAPABLE OF COPYING PLURAL REPRODUCED IMAGES FROM SINGLE ORIGINAL ON A SAME COPYING PAPER AND COPYING PROCESS THEREOF

[75] Inventor: Shigeru Moriya, Osaka, Japan

[73] Assignee: Minolta Camera Kabushiki Kaisha, Osaka, Japan

[21] Appl. No.: 451,127

[22] Filed: Dec. 15, 1989

[30] Foreign Application Priority Data

Dec. 16, 1988 [JP] Japan .................. 63-318871

[51] Int. Cl.$^5$ .............. H04N 1/23; H04N 1/387; G03G 15/04; G03G 15/16
[52] U.S. Cl. ................. 358/300; 358/450; 355/243; 355/244; 355/274
[58] Field of Search .......... 355/54, 219, 233, 243, 355/326, 327, 244, 274; 358/450, 497

[56] References Cited

U.S. PATENT DOCUMENTS

| | | | |
|---|---|---|---|
| 4,171,157 | 10/1979 | Suzuki | 355/274 X |
| 4,382,674 | 5/1983 | Miyoshi et al. | 355/274 X |
| 4,723,146 | 2/1988 | Kashara | 355/326 |
| 4,743,945 | 5/1988 | Ito et al. | 355/244 |
| 4,771,319 | 9/1988 | Hamakawa | |
| 4,849,829 | 7/1989 | Maruyama | 358/450 X |
| 4,893,150 | 1/1990 | Yamada | 355/243 |
| 4,903,079 | 2/1990 | MacAndrew | 355/243 X |
| 4,912,515 | 3/1990 | Amemiya et al. | 355/326 X |

FOREIGN PATENT DOCUMENTS

63-14177 1/1988 Japan .

Primary Examiner—Benjamin R. Fuller
Assistant Examiner—Eric Frahm
Attorney, Agent, or Firm—Burns, Doane, Swecker & Mathis

[57] ABSTRACT

A copying machine which is capable of copying a single original in the plural form on a copying paper having a size larger than that of the original and a copying process thereof. The first scanning of the single original is performed plural times to form a plurality of electrostatic latent images on a photosensitive material, said images being spaced by an interval equal to the length L which extends in the sub scanning direction of the single original or by an interval L longer than the length, thereby developing the electrostatic latent images with a toner. The resultant toner images are transferred to the copying paper in accordance with the first transfer operation. The second scanning of the original is next performed plural times while delaying a time alone corresponding to the length L which extends in the sub scanning direction of the original image so as to form plural electrostatic latent images with the interval L being left therebetween in the same manner as defined above, whereby the last-mentioned electrostatic latent images are developed with the toner. Each of the resultant toner images is transferred between the toner images formed previously on the copying paper to form consecutive plural reproduced images. Since a transfer charger is actuated in unison with the time when each of the toner image is brought to a transfer position and the icrease in charges on the copying paper is controlled, satisfactory reproduced images can be obtained.

12 Claims, 6 Drawing Sheets

COPYING MACHINE CAPABLE OF COPYING PLURAL REPRODUCED IMAGES FROM SINGLE ORIGINAL ON A SAME COPYING PAPER AND COPYING PROCESS THEREOF

BACKGROUND OF THE INVENTION

1) Field of the Invention

This invention relates to a copying machine of an electrophotographic type, which is capable of copying a single original in the plural form in succession on a copying paper having a size larger than that of the original and a copying process thereof.

2) Description of the Related Art

Copying machines have been known, which can plurally copy a single original in succession on a copying paper having a size larger than that of the single original. Such copying machines are actuated such that the original is wound on a drum and its drum is then rotated, to project the original image on a photosensitive drum in succession as shown in Japanese Laid Open Patent Publication 63-14177. It is therefore necessary to provide a specific mechanism. In the conventional-type copying machine, i.e., the copying machine having a fixed original table and a scanning optical system which is capable of moving forward and backward alternately or in the copying machine provided with a reciprocating original table and a fixed optical system, the image processing cannot be performed during the return of the scanning optical system or during the return of the movable original table. It is therefore impossible to form reproduced images in the plural form in succession on a sheet of copying paper.

Assuming that an image memory having storage capacity corresponding to one page of the original is provided in a digital-type copying machine, the copying machine can provide that the contents stored in the image memory are read repeatedly plural times successively so as to form consecutive image signals, so that the consecutive plural images are formed. However, the above-described construction needs an image memory having a large storage capacity, so that such a machine becomes extremely high price, thereby making it impossible to provide a practical copying machine.

SUMMARY OF THE INVENTION

It is an object of this invention to provide a novel copying machine in which the above-described drawbacks of the prior art have successfully been solved.

It is another object of this invention to provide a copying machine which is capable of forming plural reproduced images in succession from a single original on the same copying paper by adjusting the scanning timing and then scanning the original plural times during one image forming step.

The other object of the invention is to provide a copying process capable of forming plural reproduced images in succession from a single original.

The other objects of the present invention will become apparent from the following description and appended claims, taken in conjunction with the accompanying drawings.

DETAILED DESCRIPTION OF THE PREFERRED EMBODIMENTS

Figure 1:
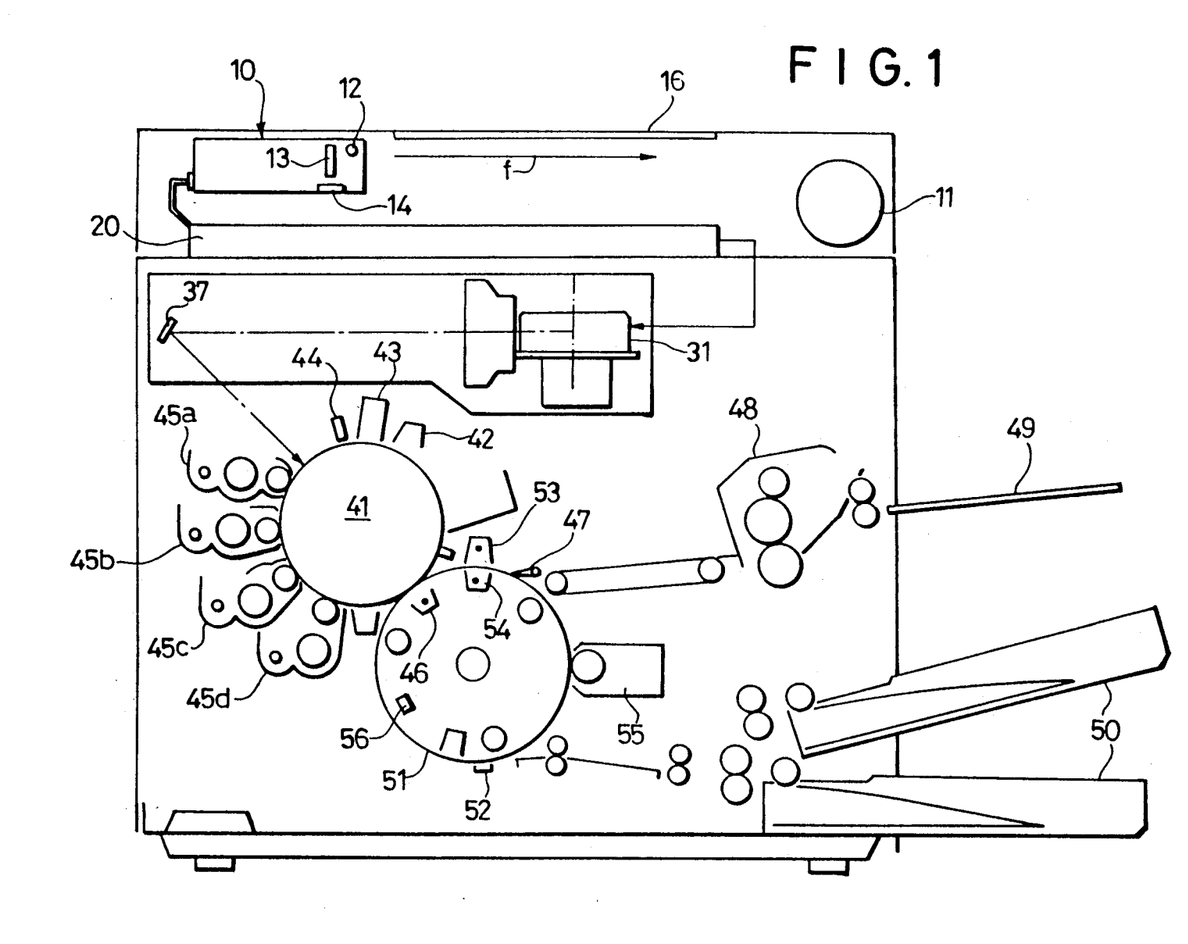
FIG. 1 is a cross-sectional view showing a structure of a digital-type color copying machine in which the present invention is rendered suitable for practice.

The embodiments of this invention will hereinafter be described with reference to the accompanying drawings. FIG. 1 is a cross-sectional view showing an overall construction of a digital-type color copying machine in which the present invention is rendered suitable for practice. In such a digital-type color copying machine, an original is first read by an image sensor and the thus-read image signal causes a laser beam to be modulated, to thereby form a pictorial latent image on a photosensitive drum. In addition, the latent image formed on the drum is developed with a toner to form a color image on a copying paper.

Referring to FIG. 1, designated at numeral 10 is a scanner, which is equipped with an exposure lamp 12 for irradiating an original, a rod-like lens array 13 which serves to collect the reflected light from the original and then introduce the same into an image sensor 14, and a color image sensor 14 to be described subsequently operative for converting the reflected light from the original into electric signals having three primary colors of red (R), green (G) and blue (B) with a picture area corresponding to one line relative to the primary scanning direction of the original.

The scanner 10 is actuated by a motor 11 and then transferred along the lower part of a copying table 16 in the direction indicated by arrow f. As a consequence, the original on the original table 16 is scanned along its primary scanning direction by the image sensor 14 and also scanned along the sub scanning direction perpendicular to its direction as the scanner 10 moves, whereby the original image is converted into an image signal by the color image sensor 14.

Designated at numeral 20 is an image signal processing unit and numeral 31 indicates a printing head. Incorporated in the printing head 31 are a semiconductor laser driver circuit 33, a semiconductor laser oscillator 34 and an unillustrated polygon mirror device. The image signal outputted from the color image sensor 14 is processed by the image signal processing unit 20 and thereafter inputted to the semiconductor laser driver circuit 33. A laser beam emitted from the semiconductor laser oscillator 34 is caused to be modulated by the image signal and the thus-modulated signal is scanned by the unillustrated polygon mirror along the primary scanning direction, followed by reflection of a mirror 37, to thereby form a latent image relative to the original image on a photosensitive drum 41 to be described subsequently.

Numeral 41 is the photosensitive drum around which an eraser lamp 42, a main charger 43, an interimage eraser 44 and developing devices 45a to 45d are arranged in that order. Each of these developing devices 45a to 45d is used to develop a latent image with a color toner. The developing devices 45a, 45b, 45c and 45d have been supplied with toners of yellow (Y), magenta (M), cyan (C) and black (B) colors, respectively.

Designated at numeral 51 is a transfer drum. The transfer drum 51 is disposed in an opposing relationship to the photosensitive drum 41 and provided therein with a transfer charger 46. Provided at a part of the transfer drum 51 is a chucking mechanism 52 for winding a copying paper to be supplied from a paper feeding tray 50 on the transfer drum 51. In addition, deelectrifying chargers 53, 54, a cleaner 55 operably provided with a space in an opposing relationship to the transfer drum 51 and a position sensor 56 for sensing rotational angular positions of the transfer drum 51. The position sensor 56 is a reflection-type photosensor and senses any one of marks applied inside the transfer drum 51 so as to output a signal.

The signal outputted from the position sensor 56 is inputted to a control CPU 25 in a controller circuit and is also used to control an operation timing for image formation such as the scan start time of the scanner 10.

Numeral 47 indicates a scraper for scraping copying papers wound on the transfer drum 51, 48 indicates a paper fixing device and 49 is a paper discharge tray.

Figure 2:
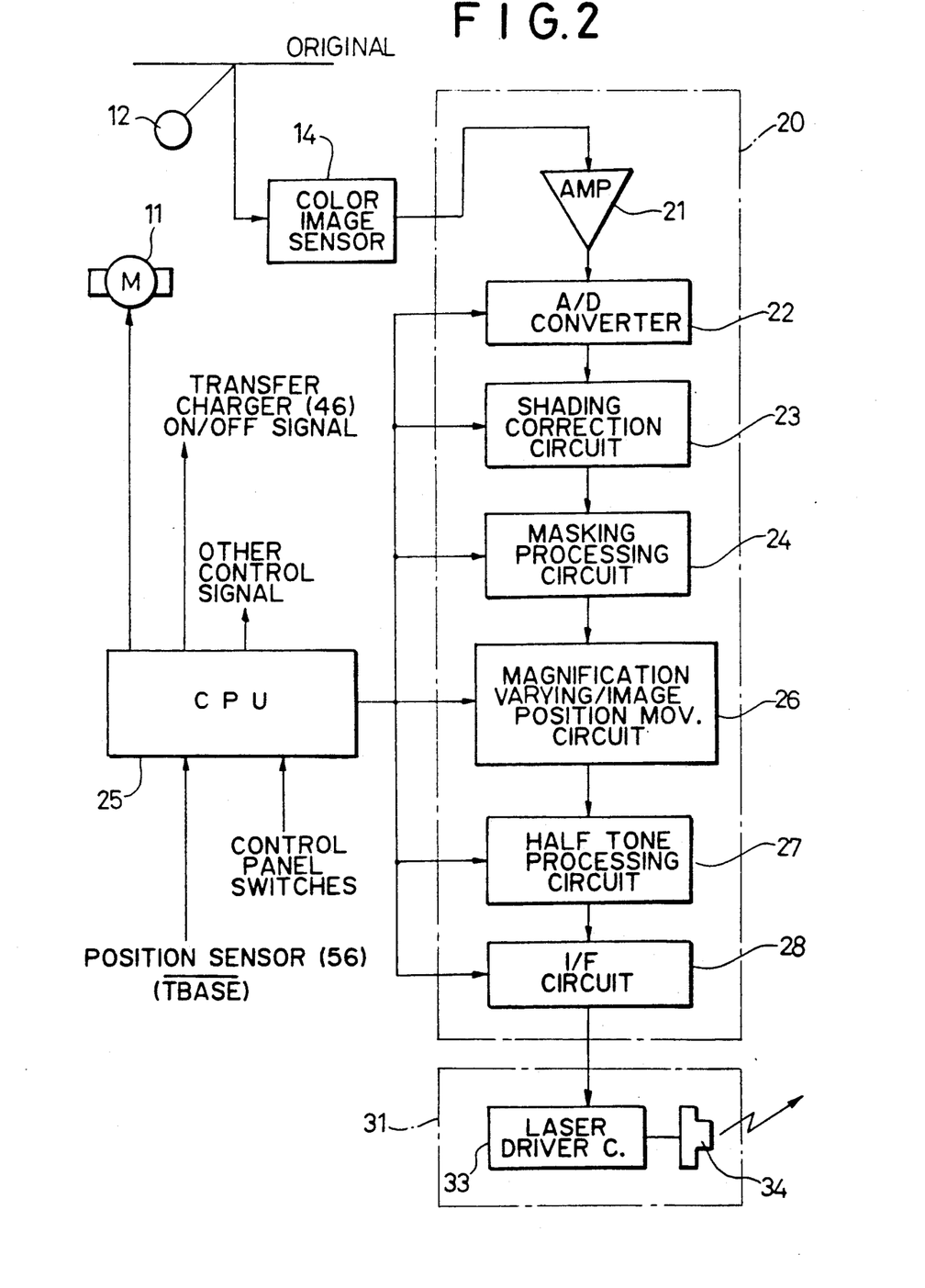
FIG. 2 is a block diagram of a controller circuit for the copying machine.

FIG. 2 is a block diagram of a controller circuit which is employed in a copying machine. In the drawing, designated at numeral 25 is a control CPU which controls the operation of the copying machine. Inputted to an input port of the control CPU 25 are signals from various key switches on a control panel, a sense signal $\overline{TBASE}$ from the position sensor 56 and other signals. To the contrary, a signal for ON/OFF controlling the transfer charger 46, a signal for controlling the motor 11 used to drive the scanner and a signal for controlling other devices are outputted from an output port.

Designated at numeral 20 is an image signal processing unit which operates under control of the CPU 25.

The image signal processing unit 20 is composed of a logarithmic amplifier 21, an A/D converter 22, a shading correction circuit 23, a masking processing circuit 24, an electrically magnification-varying/image-position moving circuit 26, a half-tone processing circuit 27 and an I/F circuit 28.

The logarithmic amplifier 21 is used to amplify the image signals of the three primary colors composed of the red (R), green (G) and blue (B), which have been photoelectrically-converted by the color image sensor 14, into signals having the intensity associated with the image density.

The A/D converter 22 serves to convert an output signal from the logarithmic amplifier 21 into a digital signal. An image signal having the gradation is outputted from the A/D converter 22.

The shading correction circuit 23 operates to perform a shading correction of the image signal.

The masking processing circuit 24 outputs a image signal corresponding to one of the yellow (Y), magenta (M), cyan (C) and black (B) colors associated with the color to be printed, from among the image signals of the three primary colors composed of R, G and B in accordance with color characteristics of toners which have been fed to the developing devices 45a to 45d.

The electrically magnification-varying/image position moving circuit 26 operates to perform a processing of the change in a copying magnification in the primary scanning direction of the original and a processing for moving the image position relative to the primary scanning direction. This can be achieved by adjusting the reading timing of the image signals which have temporarily been stored in a memory. In addition, it is also possible to output two images side by side by shifting the position of the image along the primary scanning direction or repeatedly reading image signals from the memory.

The half-tone processing circuit 27 performs the binary-coded processing of printing signals from the masking processing circuit 24 by, for example, the dither method, to thereby produce binary false halftone signals.

The I/F circuit 28 is a line memory circuit for storing image signals corresponding to one line traced along the primary scanning direction of the original. This memory circuit has a storage capacity corresponding to two lines so that the read/write operations can be executed in parallel with each other.

A description will next be made of the operation for forming color images in the digital-type color copying machine of the above-described construction.

It is necessary to separate the original image into four images having four colors composed of the three primary colors of the Red (R), Green (G) and Blue (B) and the black color and hence to develop or create the same using a toner of a predetermined color in order to form a color image. For that purpose, the scanning for separating the original image into the images having these colors is performed four times herein. The scanning for the color separation and the operation for selecting one of the developing devices associated with the colors are executed by the control CPU 25.

The digital-type color copying machine according to the present embodiment is constructed such that the photosensitive drum 41 and the transfer drum 51 are caused to be rotated at a given speed and the starting of the scan operation of the scanner 10 is controlled in unison with the operation of the transfer drum 51, whereby the transfer drum 51 and the scanner 10 are synchronized with each other. The number of rotations of the transfer drum 51 is detected by the position sensor 56 provided in the transfer drum 51. The detected signal $\overline{TBASE}$ is inputted to the CPU 25. After a predetermined time has elapsed from the negative edge of the signal $\overline{TBASE}$, the CPU 25 serves to control the motor 11 and hence to drive the scanner 10 in such a way that a tip portion of the original is read.

Figure 3:
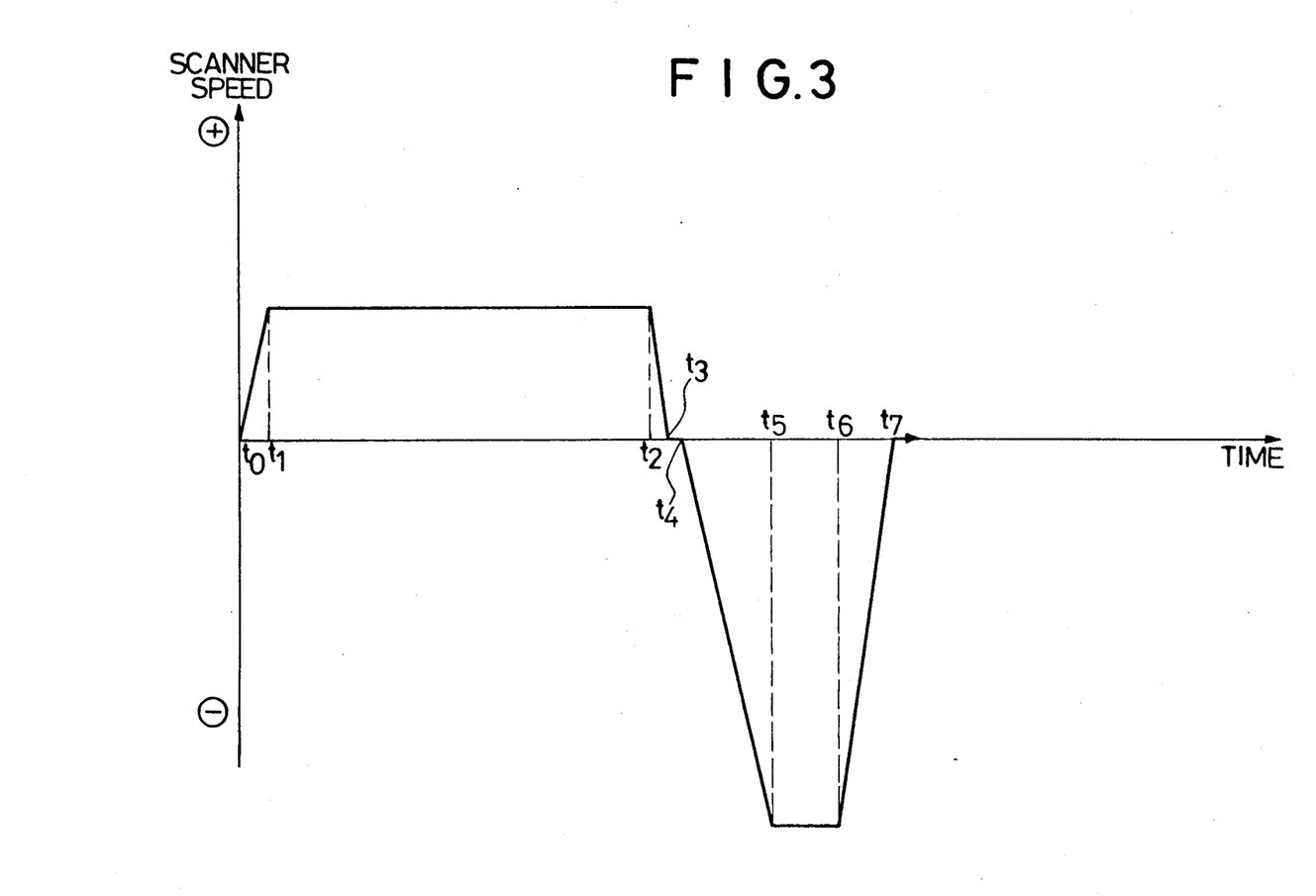
FIG. 3 is a diagram for describing the scanning speed of a scanner.

FIG. 3 is a diagram for describing the scanning speed of the scanner 10. The scanner 10 makes a start in its movement from the home position at a time to and its movement is accelerated upwardly. The scanner 10 then reaches a predetermined scanning speed at a time $t_1$, and its scanning is thereafter executed at a given speed. Its scanning is brought to completion at a time $t_2$ and at the same time, deaccelerated downwardly, followed by stoppage of its scanning of the scanner 10 at a time $t_3$. In order to return the scanner 10 to its home position, the scanner 10 makes a start in its movement in the direction opposite to the scanning direction at a time $t_4$ and its moving speed is accelerated and the scanner 10 travels at a given speed from a time $t_5$. Thereafter, its moving speed is reduced at a time $t_6$ and the scanner 10 then reaches the home position at a time $t_7$, thereby resulting in stoppage of the scanner 10. Where the return step at the negative side is compared with the scanning step at the positive side, the scanner 10 during the return step can move at a higher speed than that during the scanning step as shown in FIG. 3.

The image signals composed of the three primary colors of the R, G and B whose signals have been photoelectrically-converted by the color image sensor 14 provided in the scanner 10 are processed by the image signal processing unit 20. At this time, the control CPU 25 controls the masking circuit 24. In addition, the control CPU 25 outputs an image signal of a yellow color (Y) upon the first scanning of the scanner and controls such that the developing device 45a which has been supplied with a yellow toner associated with the image signal of the yellow color is rendered in an operated state. Accordingly, the image signal of the yellow (Y) color outputted from the image signal processing unit 20 causes a laser beam emitted from the semiconductor laser oscillator 34 to be modulated, to thereby form an electrostatic latent image on the photosensitive drum. Thereafter, the electrostatic latent image is developed by the developing device 45a which has been rendered in the state to be operated by the signal outputted from the control CPU 25 and has been supplied with the yellow toner.

On the other hand, a copying paper fed from the paper feeding tray 50 has been wound on the transfer drum 51, so that the toner image of the yellow (Y) color formed on the photosensitive drum 51 is transferred thereto.

An image of the magenta (M) color obtained after completion of processing of the second scanning, development and transfer is superimposed on the toner image of the yellow (Y) color formed on the copying paper, which has been wound previously on the transfer drum, to thereby be transferred thereto. Likewise, an image of the cyan (C) color upon the third scanning and an image of the black (B) color upon the fourth scanning are superimposed successively on the toner image formed on the copying paper, whereby the transfer of these images is performed.

When the toner images composed of different four colors are superimposed on the copying paper so as to form a complete image, the copying paper is scraped from the transfer drum 51 by the scraper 47 and then fixed by the paper fixing device 48. After that copying paper is discharged on the paper discharge tray 49.

A description will next be made of the processing of copying a single original on a sheet of copying paper in the plural form with reference to a timing chart shown in FIG. 4.

When the portion of the negative edge of the signal $\overline{\text{TBASE}}$ outputted from the position sensor 56 is brought about upon the first rotation of the transfer drum 51, the scanner 10 set in the home position makes a start in the operation of the first scanning and returns to the home position with completion of its scanning operation. The first latent image a associated with the original is formed on the photosensitive drum 41 by the first scanning.

The scanner 10 further starts its second scanning operation and the second latent image b associated with the original image is formed on the photosensitive drum 41 after completion of its scanning. Needless to say, a time at which the scanner 10 starts its second scanning operation occurs in a point delayed from a time at which it makes start in the operation of the first scanning. Where the equimultiple copying is performed, the last-mentioned scanning start time is delayed by the time interval required for the rotation of the transfer drum 51 or longer whose interval corresponds to twice (2L) the length L which extends in the sub scanning direction of the original over the outer peripheral face of the transfer drum 51 after the signal $\overline{\text{TBASE}}$ has been outputted. When the scanning start time is taken as 2L, the images can plurally be formed in succession.

The first and second latent images a,b formed on the photosensitive drum 41 are developed by the developing device 45a which have been supplied with the toner of the yellow color to form toner images, and the resultant toner images A and B are transferred to the copying paper wound on the transfer drum 51.

When a signal $\overline{\text{TBASE}}$ is outputted from the position sensor 56 subsequent to a start in the second rotation of the transfer drum 51, the scanner 10 makes a start in the operation of the third scanning after a predetermined period of time has elapsed from the trailing edge of the signal $\overline{\text{TBASE}}$, and the third latent image c associated with the original is hence formed on the photosensitive drum 41. Here, the term "the elapsed predetermined time" referred to above corresponds to a period which has elapsed by a time required for the rotation of the transfer drum 51 whose period is equivalent to the length L which extends in the sub scanning direction of the original over the outer peripheral face of the transfer drum 51 after the signal $\overline{\text{TBASE}}$ has been outputted.

Furthermore, the scanner 10 makes a start in the operation of the fourth scanning. Similarly to the above, the fourth latent image d associated with the original image is formed on the photosensitive drum 41. Where the equimultiple copying is performed, the fourth scanning start time is delayed by a time interval required for the rotation of the transfer drum 51 whose interval corresponds to three times (3L) the length L which extends in the sub scanning direction of the original over the outer peripheral wall of the transfer drum 51 after the signal $\overline{\text{TBASE}}$ has been outputted.

The third and fourth latent images c and d which have been formed on the photosensitive drum 41 in the above-described manner are developed by the developing device 45a which has been supplied with the toner of the yellow color to form toner images, and the resultant toner images C an D are transferred to the copying paper wound on the transfer drum 51.

As a consequence, said images A, C, B and D which have assumed the yellow a the first developing color are formed in that order on the same copying paper in succession.

In addition, where the magenta as the second developing color, the cyan as the third developing color and the black as the fourth developing color are used, exactly the same processing a described above is performed. Consequently, said images A, B, C and D can be produced in full color on the copying paper.

In this case, the transfer of the toner images to the copying paper has been performed in order of A, B, C and D. However, the transfer of the toner images may first be carried out in order of C and D, followed by A and B.

Further, if one desires to produce three same images in succession in the direction of the sub scanning, the front and rear images from among the three images may be produced upon the first rotation of the transfer drum 51 and the remainder, i.e., the central image may be produced upon the second rotation of the transfer drum 51. Otherwise, the central image may first be produced upon the first rotation thereof, followed by production of the remainder upon the second rotation thereof.

Incidentally, omitted for convenience' sake, from the above description is a description about a delay corresponding to a rise time required from the time that the signal $\overline{TBASE}$ is outputted until the time that the scanner actually makes a start in the scanning operation, and a delay corresponding to a slight time required from the time that the latent image is formed on the photosensitive drum until the time that the toner image is transferred to the copying paper on the transfer drum.

When the above-described copying process is used, the number of times the toner image is to be transferred to the copying paper is increased. As a consequence, the residual electric charges on the copying paper are increased, so that the toner image is not transferred efficiently. A potential problem therefore arises that satisfactory copied or reproduced images cannot be obtained.

Figure 4:
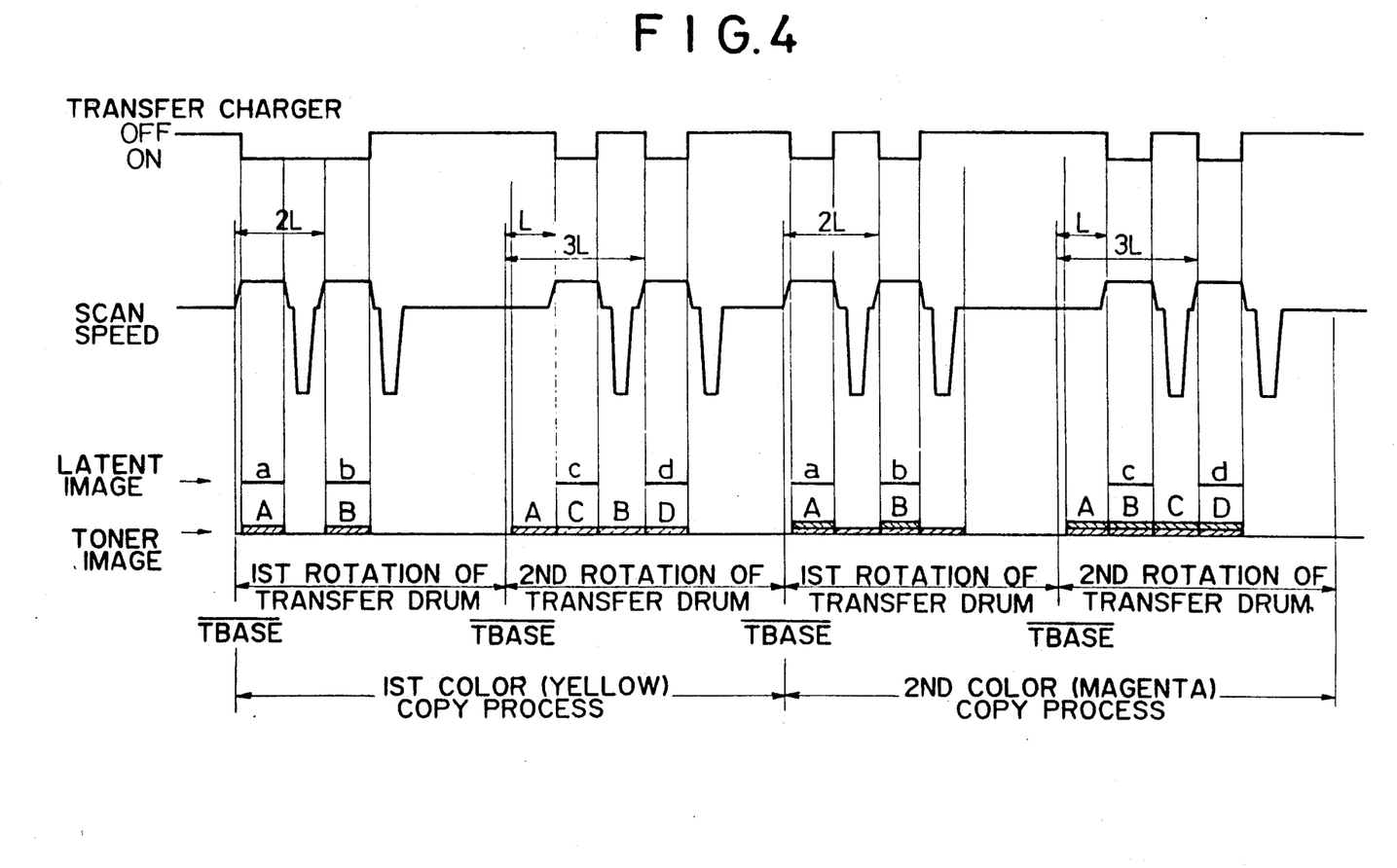
FIG. 4 is a timing chart for describing a process for copying a single original in the plural form on a sheet of copying paper.

As shown in FIG. 4, the ON/OFF operation timing of the transfer charger is controlled in the present invention. In other words, when the transfer time of the toner image takes place subsequent to the output of the signal $\overline{TBASE}$, the transfer charger is brought to an ON state over the overall area of the copying paper during the initial copying step, i.e., during the first rotation of the transfer drum 51. The copying paper is then held on the transfer drum 51 by electric charges and the toner image on the photosensitive drum 41 is transferred to the copying paper. Subsequent to the second rotation of the transfer drum 51, the period during which the transfer charger is held an ON state is controlled only when the toner image on the photosensitive drum 41 is put in the transfer position. Such control is executed by the control CPU 25.

Owing to the control of the ON/OFF operation timing of the transfer charger as described above, the transfer charger is brought to the ON state only over the area where the toner image is transferred to the copying paper. Therefore, the residual charges on the copying paper is not increased at random eve when the toner image is transferred plural times to the copying paper, thereby making it possible to form a satisfactory image.

Figure 5:
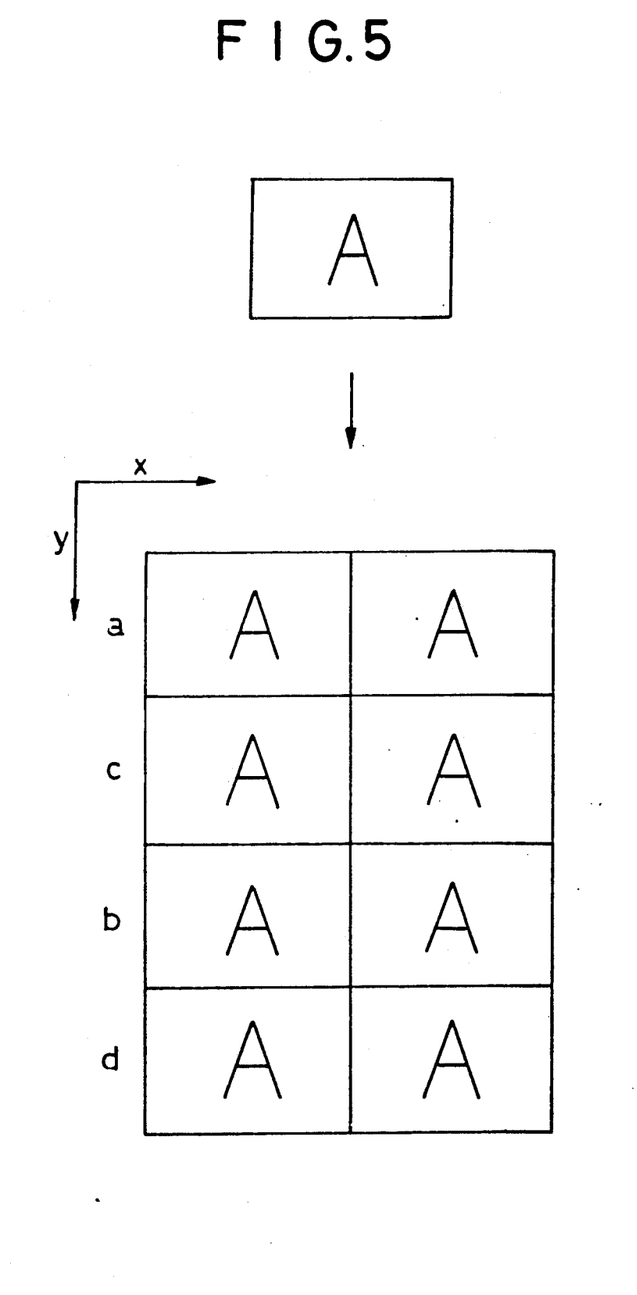
FIG. 5 is an illustrative example of a print obtained by copying a single original in the plural form on a sheet of copying paper.

In the above-described processing in which the plurality of reproduced images can be formed on a sheet of copying paper from the single original, the original is read by the image sensor and the thus-read image is stored as an image signal in the memory. Therefore, the electrically magnification-varying/image-position moving circuit 26 can control the timing at the output of its signal and also perform the processing for outputting the same signal plural times (e.g., two times). As shown in FIG. 5, such a processing permits arrangement in parallel of images copied in the plural form from the single original in the transverse direction (in the direction indicated by arrow X) of the copying paper and the consecutive formation of the images copied plurally from the single original in the direction of the length (in the direction indicated by arrow Y) of the copying paper. An example shown in FIG. 5 shows that the eight reproduced images in amount which consist of 2 rows × 4 columns can be formed on a copying paper of size $A_3$ where the original of size $A_6$ is used.

A description will next be made of change in copying magnification. In the present embodiment, the change in copy magnification in the primary scanning direction of the original image is performed by the electrically magnification-varying/image-position moving circuit 26 in the image signal processing unit 20 when one desires to change the copying magnification. In other words, when one desires to enlarge the image, the image signals corresponding to one line traced along the primary scanning direction whose signals have been stored in the memory may be enlarged by inserting an interpolation signal midway between signals associated with respective picture elements in accordance with its expansion magnification, while where one wants to reduce the size of image, the image signals may be reduced by removing a part from signals associated with respective picture elements.

The change in the copying magnification in the sub scanning direction is performed by changing the scanning speed of the scanner 10 in accordance with the copying magnification. In this case, the scanning start times up to the time that the scanner 10 reaches a predetermined scanning speed depending upon the copying magnification are different from one another depending on the copying magnification. This will therefore cause a change in the home position of the scanner 10 in accordance with the copying magnification.

Figure 6A:
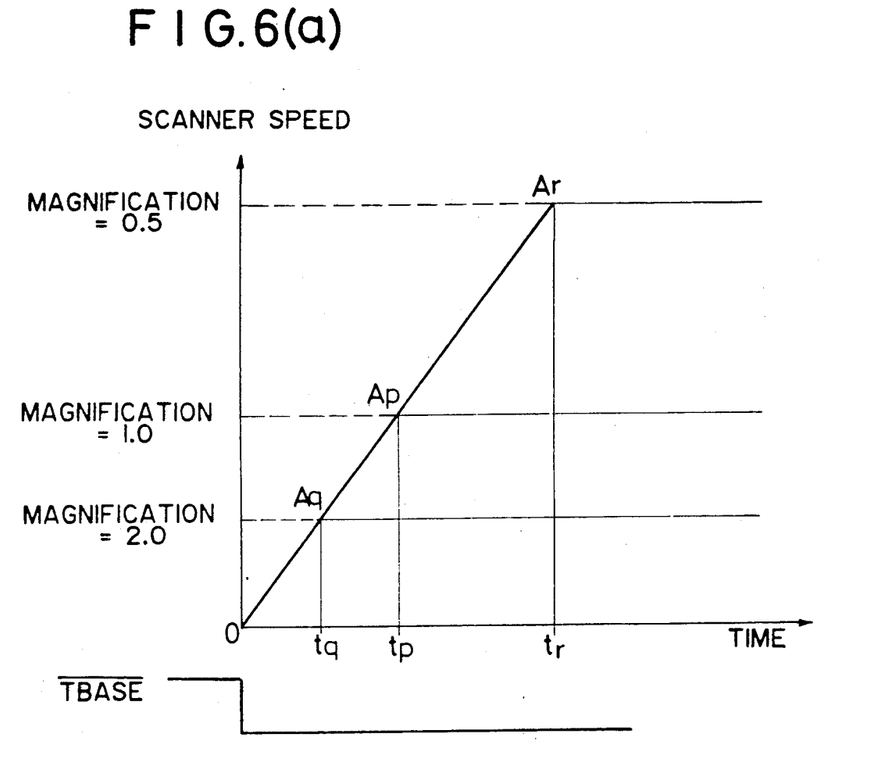
FIG. 6(a) is a diagram showing the time and scanning speed of a scanner whose speed is associated with the copy magnification.
Figure 6B:
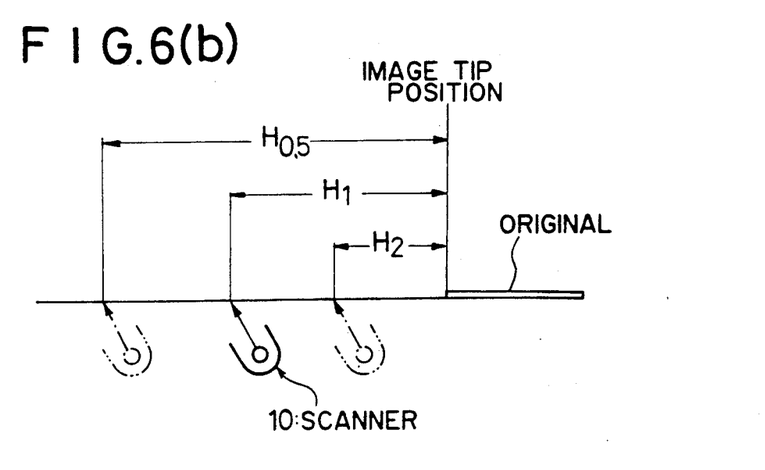
FIG. 6(b) is a schematic view illustrating positional variations in the home position of the scanner whose position is associated with the copy magnification.

FIGS. 6(a) and 6(b) are diagrams for describing change in the copying magnification. In FIG. 6(a), the axis of abscissas assumes time variations from the scanning start time of the scanner, while the axis of ordinates assumes the scanning speed of the scanner. Referring to FIG. 6(a), when the equimultiple copying is performed, the scanner reaches a predetermined scanning speed Ap at a time tp, while when the twofold copying magnification is used, the scanner reaches a predetermined scanning speed Aq at a time tq. In addition, the scanner reaches a predetermined scanning speed Ar at a time tr upon use of the copying magnification by 0.5 times.

Accordingly, the home position of the scanner is set at a location spaced from the tip portion of the image by a distance required for the scanner 10 to travel during the time until the time that the scanner reaches the predetermined scanning speed depending upon the copying magnification. FIG. 6(b) is a schematic view for describing the home position of the scanner depending upon the copying magnification. When the equimultiple copying is taken, the position $H_1$ shows the home position of the scanner, while the home position $H_2$ is brought to a location adjacent the tip portion of the image compared with the home position $H_1$ when the twofold copying magnification is chosen. When the copying magnification is taken as 0.5 times, the home position $H_{0.5}$ is brought to a location away from its tip portion compared with the home position $H_1$.

In the above-described embodiment, after completion of the transfer of the initial toner image to the copying paper which has been wound on the transfer drum, the following toner image is transferred to the copying paper without fixing the previous toner image after the paper to which the initial toner image has been transferred has been fed again to the transfer portion. In this manner, the toner images are superimposed on one another successively and the thus-superimposed images are fixed as final. As an alternative, its fixing may be carried out for each transfer of the toner image, and the following toner image may thereafter be transferred and then fixed thereon.

In addition, the copying machine according to the present embodiment is of the type that the original table is fixed and the scanning optical system is moved reciprocatingly during its operation. However, such machine may be used as a type that the original table is movable forwardly and backwardly so as to perform the necessary scanning.

The present invention can be applied even to an analog-type copying machine. The present invention is not necessarily limited to the digital-type copying machine which has been described in the aforementioned embodiment.

According to the present invention, the toner image formed during a first copying cycle is different in position to be transferred to the copying paper from each toner image formed during each copying cycle subsequent to the above cycle operation, whereby the reproduced images can be formed consecutively without superimposing the same on one another. As a consequence, a large number of the images can be formed by reducing the number of times an operation cycle is to be repeated for the image production.

It is further possible to reduce the residual electric charges on the copying paper and hence to bring about the satisfactory reproduced images because the transfer charger is actuated only when the toner image is located at the transfer position even in the case where the number of times the toner image is to be transferred to the copying paper is increased.

Having described our invention as related to the embodiment shown in the accompanying drawing, it is our intention that the invention be not limited by any of the details of description, unless otherwise, specified, but rather be construed broadly within its spirit and scope as set out in the accompanying claims.

What is claimed is:

1. A copying machine comprising:
    an original-carrying table for supporting thereon an original;
    a photosensitive material rotatably mounted in the copying machine;
    an original scanning means movable relative to the original-carrying table for scanning the original thereon to obtain an original image;
    a means for projecting the original image on the photosensitive material to form an electrostatic latent image;
    a control means for driving the original scanning means a plurality of times to form plural electrostatic latent images on the photosensitive material;
    a means for successively developing the plural electrostatic latent images on the photosensitive material with a toner to form plural toner images; and
    a means for transferring the plural toner images successively formed on the photosensitive material onto a recording medium.

2. The copying machine as claimed in claim 1, wherein the original scanning means includes a scanner movable forwardly and backwardly along the original-carrying table.

3. The copying machine as claimed in claim 2, wherein the projection means includes means for varying a copying magnification, and the control means being capable of shifting a start position of the scanner depending upon the copying magnification of the projecting means.

4. A copying machine comprising:
    an original-carrying table for supporting thereon an original;
    a photosensitive material rotatably mounted in the copying machine;
    a scanner movable reciprocatingly relative to the original-carrying table so as to scan the original thereon to obtain an original image;
    a means for projecting the original image on the photosensitive material to form an electrostatic latent image;
    a means for developing the electrostatic latent image on the photosensitive material with a toner to form a toner image;
    a means for transferring the toner image to a recording paper;
    a means for transporting the recording paper on which the toner image has been transferred to the transferring means again; and
    a means for controlling operation timing of the scanner such that the original is scanned a plurality of times during a first copying cycle to form a first plurality of toner images with a spacing L defined therebetween whose spacing corresponds to a distance from a tip portion to an end portion of the image, and the original is next scanned a plurality of times during a second copying cycle to be repeated subsequent to the first cycle to form a second plurality of toner images each of which is shifted by the spacing L in a primary scanning direction of the original relative to each of the toner images formed during the first copying cycle.

5. The copying machine as claimed in clam 4, wherein the transferring means includes a transfer charger for transferring the first and second plurality of toner images to the recording paper and a transfer charger control means for actuating the transfer charger only when the toner images formed on the photosensitive material are disposed in an opposing relationship to the transfer charger.

6. A process for copying an original image which is placed on an original-carrying table, said process being adapted to scan the original by means of a scanner which is movable forwardly and backwardly along the original-carrying table so as to expose the image onto a photosensitive material, comprising the steps of:
    scanning the original on the original-carrying table at least twice during a first copying cycle to form, on the photosensitive material, at least two electrostatic latent images with a spacing therebetween;
    developing the electrostatic latent images on the photosensitive material with toners to form toner images;
    transferring, as a first transfer step, the toner images to a sheet of recording paper;
    scanning the original placed on the original-carrying table at least once by the scanner during a second copying cycle to form, on the photosensitive material, an electrostatic latent image;
    developing the electrostatic latent image formed on the photosensitive material with toner to form a toner image; and
    further transferring, as a second transfer step, the toner image on an area of the recording paper, said area corresponding to the spacing formed between the first-mentioned toner images.

7. A process for copying an original image which is placed on an original-carrying table, said process being adapted to scan the original by making use of a scanner which is movable reciprocatingly along the original-carrying table for exposing the image onto a photosensitive material, comprising the steps of:

scanning the original placed on the original-carrying table by means of the scanner during a first copying cycle so as to form an electrostatic latent image on a photosensitive material;

developing the electrostatic latent image formed on the photosensitive material with a toner to form a toner image;

transferring, as a first transfer step, the toner image on a sheet of recording paper;

scanning at least twice the original image placed on the original-carrying table by means of the scanner during a second copying cycle so as to form electrostatic latent images on the photosensitive material with a space therebetween, said space being equal to or larger than the electrostatic latent image formed in the first copying cycle;

developing at least two electrostatic latent images formed on the photosensitive material with a toner to form toner images; and further transferring, as a second transfer step, the toner images on areas of the recording paper different from an area on which the first-mentioned toner image has been transferred during the first transfer step.

8. A copying machine for producing a plurality of same images on a single copying paper, said copying machine comprising:

first copying mode for scanning an original at least twice to form at least two images, each of said image being spaced apart by a distance of at least L where the distance L equal to a length of the each image from a leading end to a trailing end; and second copying mode for scanning the original to form an image having a length corresponding to said distance L and occupying an area defined by the distance L.

9. A copying machine for producing a plurality of same images on a single copying paper, said copying machine comprising:

first copying mode for scanning an original to form an image having a length L in a scanning direction; and second copying mode for scanning the original at least twice to form at least two images, each of said images being spaced apart by a distance of at least L in the scanning direction so as to sandwich the image formed by the first copying mode.

10. The process as claimed in claim 6, wherein said spacing produced between the electrostatic latent images formed in a first copying cycle is equal to or larger than a distance from tip portion to end portion of the electrostatic latent image formed in a second copying cycle.

11. A copying machine comprising:

an original-carrying table for supporting thereon an original;

a photosensitive material rotatably mounted in the copying machine;

a scanner movable reciprocatingly relative to the original-carrying table so as to scan the original thereon to obtain an original image;

a means for projecting the original image on the photosensitive material to form an electrostatic latent image;

a means for developing the electrostatic latent image on the photosensitive material with a toner to form a toner image;

a means for transferring the toner image to a recording paper;

a means for transporting the recording paper on which the toner image has been transferred to the transferring means again; and a means for controlling the scanner to execute a first plural scanning operation and a second plural scanning operation in each of which the original is scanned a plurality of times for forming a plurality of toner images with a space therebetween, said space being equal to or larger than a size of the toner images produced in the first and second plural scanning operations, and said second scanning operation being executed such that each toner image formed in the second plural scanning operation is positioned between the toner images formed in the first plural scanning operation.

12. The copying machine as claimed in claim 11, wherein said transferring means includes a transfer charger for transferring the toner images produced by the first and second plural scanning operations onto the recording paper and an inhibiting means for inhibiting operation of the transfer charger when said toner images are not opposite to the transfer charger.

* * * * *